A. F. ROCKWELL.
COMPARATOR GAGE.
APPLICATION FILED NOV. 26, 1913.
1,274,331.
Patented July 30, 1918.
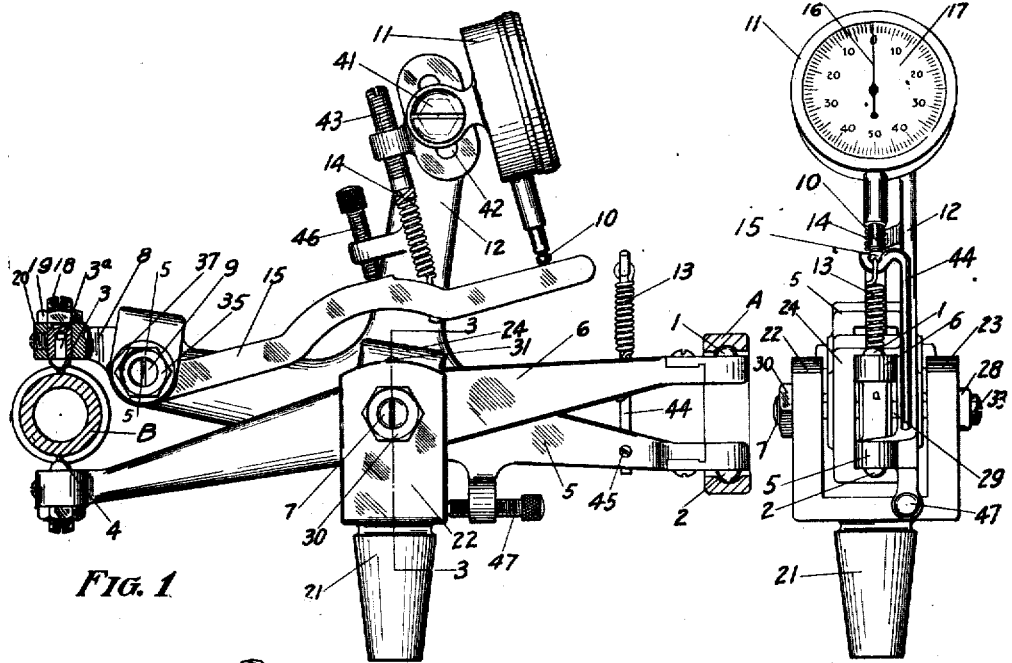
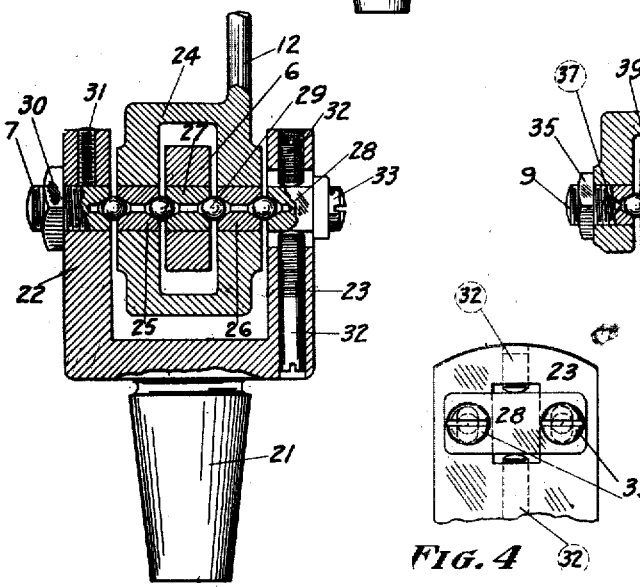
WITNESSES:
INVENTOR:
ALBERT F. ROCKWELL
BY
his ATTORNEY.

UNITED STATES PATENT OFFICE.

ALBERT F. ROCKWELL, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

COMPARATOR-GAGE.

1,274,331.

Specification of Letters Patent. Patented July 30, 1918.

Application filed November 26, 1913. Serial No. 803,313.

*To all whom it may concern:*

Be it known that I, ALBERT F. ROCKWELL, a citizen of the United States, residing at Bristol, county of Hartford, State of Connecticut, have invented a certain new and useful Comparator-Gage, of which the following is a full, clear, and exact description, such as will enable others skilled in the art to which it appertains to make and use the same, reference being had to the accompanying drawings, forming part of this specification.

My invention relates to measuring instruments and more particularly to comparator gages.

In the manufacture of the cups and cones of antifriction bearings it is not always practically feasible to turn out cup and cone pairs the elements of which are accurately matched without giving one of the elements of the pair a final accurately gaged fine grinding so as to accurately match it with the other element of the pair. Heretofore the necessary gaging and comparing has been done by the aid of two gages one for each element of the pair. The disadvantages consequent to this two-gage method were, among others, that it has been necessary for a workman to watch two gages and compare their readings, that there was a possibility of a lack of accurate correspondence between the gages, and that a large number of gages were required. I have devised a gage having but a single indicator and by the aid of which the necessary gaging and comparing can be done, which will indicate when the difference between the diameters of the elements of a pair is equal to the standard difference, and which will also indicate the variations of the diameter-difference of a pair from the standard diameter-difference.

One object of my invention is to provide a gage with which objects may be compared simply, quickly and accurately.

Another object is to provide a gage for comparing and matching cups and cones and like articles.

To these ends and also to improve generally upon devices of the character indicated my invention consists in the following matters hereinafter described and claimed.

In the accompanying drawings:—

Figure 1 is a side elevation of a gage embodying my invention.

Fig. 2 is an end elevation of the gage shown in Fig. 1.

Fig. 3 is a sectional view, being substantially a section on line 3—3 of Fig. 1.

Fig. 4 is a fragmental side view of the support.

Fig. 5 is a section on line 5—5 of Fig. 1.

Fig. 6 shows a ball tip.

Without restricting my invention thereto I show and describe a gage more particularly adapted to the comparing of cups and cones.

The illustrated gage comprises two sets of contact elements 1, 2, and 3, 4, respectively. These are carried by the arms 5 and 6 pivoted at 7. This construction provides that, as the elements 1 and 2 move with respect to each other, the elements 3 and 4 are proportionally moved with respect to each other. As here illustrated all of the elements are at substantially equal radial distances from the pivotal point 7 whereby as the elements 1 and 2 are moved with respect to each other a certain amount the elements 3 and 4 will be moved with respect to each other an equal amount.

The contact element 3 is carried by the arm 5 by means of a lever 8 pivoted to the arm 5 at 9. Thus there is provided for the element 3 a movement relative to its mate 4 in addition to that provided by the pivotal movement of the arms 5 and 6.

The lever 8 has its arm 15 extending beyond the pivot or fulcrum to engage the plunger or actuator 10 of the dial indicator 11. This indicator is of the well known type in which the in and out movements of the plunger actuate the pointer, the plunger being at all times urged toward its outermost position by resilient means within the instrument. The indicator 11 is carried by the projection 12 of the arm 5 to move with said arm. The recited construction provides an arrangement whereby relative movement of the arms 5 and 6 need not affect the indicator but movement of the element 3 about its pivot 9 may affect the indicator. If desired, the arms 5 and 6 may be urged apart by resilient means, as a spring 13 for example. Also, the lever 8 may be supported by a spring as 14.

It will be seen that, in operation, whenever a cup and cone pair is in place in the gage which cup and cone have the same difference between their diameters, i. e., the same diameter-difference, as exists between the diameters of another pair (regardless of the actual length of the diameters) the pointer 16 of the dial indicator will stand at the same graduation of the dial 17 in the one case as in the other. If, however, the diameter-difference of the one pair varies from the diameter-difference of the other, the variation will be indicated by the pointer.

In using the illustrated gage as an aid in the matching of cups and cones, I may proceed as follows: First a standard cup and cone, i. e., a cup and cone whose diameter-difference is the standard amount, are placed in the gage, the cup being placed first. When the cup is placed the gage elements 3 and 4 are relatively moved exactly as are the elements 1 and 2, and, as regards relative movement of the arms 5 and 6, are held by the cup in the position assumed. When the cone is placed, presuming its diameter to be greater than the then distance between elements 3 and 4, the element 3 swings about the pivot 9 thus moving the indicator pointer. Second, the graduation at which the pointer stands is noted, preferably by turning the dial to bring the zero of the dial under the pointer. This completes the calibration of the gage.

The standard pair is now removed and a cup A, of the pair to be matched, placed in position. In this operation the elements 1, 2, and the elements 3, 4 are moved relatively to each other by an amount equal to the difference between the diameter of the standard cup and the cup A but with no actuation of the indicator. The elements 3 and 4 are now fitted over the cone B being ground. Presuming that the cone B is larger than it should be to match the cup A the pointer will be moved from zero and will indicate how much too large the cone B is. The grinding is carried on until the pointer returns to zero which indicates that the diameters of A and B now vary by the standard amount and therefore the cup and cone are properly matched.

It will be understood that, although I have above described the calibration and use of the gage with reference to first placing the cup and then placing the cone, the order of these operations is of no moment. For example, if first a cone is placed, the arms 5 and 6 will spread to accommodate it, and if second a cup too small for the cone is placed, the arms will be brought together and the lever 8 actuated but, in this case, as in the former case, the distance between the contact elements 3 and 4 is, in fact, the distance obtained by moving the elements 1 and 2 apart plus the distance obtained by moving the element 3 about the pivot 9, and the indicator shows the extent of the additional movement. Also, if a cone is too small for a cup the device will show this also as in this case the additional movement of the element 3 is negative instead of positive.

Although I have more particularly described a gage embodying my invention as used in the gaging of circular or annular objects it will be understood that it is by no means restricted to such use being equally applicable to the matching and comparing of any objects.

The means for moving the units of one set of contact elements with respect to each other proportionally, (as equally), as the units of another set are moved, as for example the means comprised by the arms 5 and 6, may be of any character capable of accomplishing the desired results. The additionally movable element, as the contact element 3, may be mounted with relation to the element of the moving means, as the arm 5, in any suitable manner which will provide the desired additional movement. The use of a lever, as 8, is desirable as it provides a ready means whereby the actual movements of the additionally movable element 3 are multiplied in being transmitted to the indicating means. It will of course be understood that, although the illustrated lever 8 is of the first class, it might be of any other suitable class, so that, although in the present instance the two arms of the lever are distinct and lie at different sides of the fulcrum, this need not necessarily be the case.

The contact elements 1, 2, 3 and 4 may be of any suitable forms. Preferably the elements intended for contact with a cup race are of the ball tip character, illustrated as parts 1 and 2 and are detachably connected with the arms 5 and 6 as shown. The detachable feature is desirable for the reason that different sized elements may be used to meet various conditions such, for example, as the condition arising when a cup is to be gaged which is of a diameter so great that it is not advisable to permit the arms (provided with small tips) to move sufficiently far apart to accommodate it, in which case larger tips will be put in place. If desired the tips may have more than one ball; a two ball tip is illustrated in Fig. 6 but obviously any suitable number of balls may be used.

The contact elements intended for contact with a cone race may well, but not necessarily, be of the adjustable diamond tip form illustrated. In the present instance a diamond, as 3, is carried by a holder 3ª tightly received in the screw 18, such screw being locked in position by the nut 19 and the set screw 20. By the use of a diamond I provide for proper resistance to the wear resulting from the contact of the contact element with the rapidly rotating cones. By the adjusting means, as the screw 18, I provide for the diamonds being moved farther apart or nearer together to meet various conditions, to correspond with the various sized ball tips used.

The indicating means, here illustrated by way of example as the dial indicator 11, may be of any desired form and construction. Where, as in the present instance, graduations (see Fig. 2) are provided in addition to the one, as zero, which marks the position that the pointer should assume when indicating that the contact elements 3 and 4 are in the desired relationship (e. g., the relationship brought about by a cone of proper size to match a cup), such additional graduations may desirably indicate thousandths of an inch movement of the actuator. In the present device, with the lever 8 giving a 5 to 1 multiplication, a movement of 5 graduations of the pointer indicates a movement of .001 inch of the element 3.

As here illustrated the arms 5 and 6 are carried by the support 21 having yoke arms 22 and 23 between which the arms 5 and 6 are supported to swing with respect to each other and to the support. Conveniently the base of the support 21 may have the form of a frustum of a cone whereby it may be conveniently mounted, as upon the grinding machine, to be swung into and out of gaging relation to the work. The connection between the arms and the yoke may be of any suitable character. In the present instance the arm 5 is provided with a box 24 carrying in its sides double socketed bushings 25 and 26 respectively. The arm 6 carries a double socketed bushing 27. The yoke arms 22 and 23 carry respectively the socketed adjusting screw 7 and the socketed adjusting block 28. Balls 29 are received in the sockets as shown. Thus the two arms are accurately and practically frictionlessly mounted with respect to the support 21 and to each other. The screw 7 is shown as locked in position by the nut 30 and the set screw 31, while the block 28 may be vertically adjusted by the screws 32 and locked in adjusted position by the set screws 33.

The pivotal connection between the arm 5 and the lever may, as shown, be generally similar to that just described and comprise the socket screws 9 and 34, the bushing 39, and the balls 40, the socket screws being held in adjusted position by the nuts 35 and 36 and the set screws 37 and 38.

The indicator, such for example as the before referred to dial indicator 11, is preferably mounted upon the arm 5 by means of the bolt 41 adjustable in the slot 42 of the projection 12. In this way I provide for the rough adjustment of the indicator during calibration. Obviously the indicator will be so located with reference to the arm 15 that the plunger 10 will always be forced against the arm by the resilient means of the indicator. The spring 14 may be adjusted as to tension by the screw 43 while the spring 13 may be adjusted by means of the rod 44 held in adjusted position by the set screw 45. Abutments, as screws 46 and 47, may be provided for the lever 8 and arm 5 if desired. It will be noted that the spring 14 pulls the lever into contact with the stop screw 46 so that the lever 8 is normally held stationary with respect to the arm 5 when no cone is in place and, if desired, the screw may be adjusted to just contact the lever when a standard pair is in place whereby the only pivotal movement of the lever will be that necessary to permit the elements 3 and 4 to fit over a cone larger than it should be to match a cup.

It will be seen that I have provided a comparator gage by the aid of which articles, as cups and cones, may be compared, which will indicate deviations from a standard difference, as deviations from a standard diameter-difference, and which withal is simple to construct and operate, accurate, and comparatively inexpensive.

Having thus described my invention, what I claim as new and desire to secure by Letters Patent is:—

1. In a measuring instrument, two sets of relatively movable contacts, and means whereby the distance between the contacts of one set is determined by the movement between the contacts of the other set, one of said contacts of said first mentioned set being also free to move with respect to its fellow contact under the influence of the article being measured and independently of the other set of contacts; substantially as described.

2. In a comparator gage for indicating when the units of a pair of objects have a desired, standard, dimensional-difference and also indicating variations from said dimensional-difference, in combination, a pair of arms fulcrumed with respect to each other, two contact elements carried by each said arm on non-coincident radii from the fulcrum to provide two sets of contact elements each for gaging contact with a respective unit of said pair of objects and each comprising two mated elements, the four elements being at equal distances from the fulcrum, means whereby one said element can have movement relative to its mate additional to that provided by the movement of said arms, the difference between the normal span of the one set of said elements when said additionally movable element is in neutral position and the span of the other set of elements being equal to said desired, standard, dimensional-difference, and means for indicating movements from neutral position of said additionally movable element; substantially as described.

3. In a device for the comparative gaging of the matched race members of a cup and cone pair, each member of such a pair having a raceway of a contour adapting it for coöperation with the raceway of the other to provide a race for antifriction members, in combination, two pairs of contact elements, one pair consisting of tips of a contour and character adapting them to fit into the raceway of one of the members of said matched pair in gaging relation therewith, and the other pair of elements consisting of tips of a contour and character adapting them to fit into the matching raceway of the other member of said matched pair in gaging relation therewith, and means for connecting said two pairs of tips and moving the tips of one pair with respect to each other proportionally to the movements of the tips of the other pair with respect to each other; substantially as described.

4. In a device for the comparative gaging of the elements of a cup and cone pair; each element of such a pair having a raceway of a contour adapting it for coöperation with the raceway of the other to provide a race for antifriction members; in combination, a plurality of sets of contact elements, one set comprising point tips of a conformation adapting them to fit in gaging relation upon the raceway of one of said elements of said pair and another set comprising tips including each an antifriction member of a size and contour adapting it to fit in gaging relation upon the raceway of the other element of said pair, and means for connecting said two sets and moving the contact elements of one set with respect to each other proportionally to the movements of the contact elements of the other set with respect to each other; substantially as described.

5. In a device of the character indicated, in combination, a plurality of sets of contact elements, means for moving units of one set with respect to each other proportionally to the movements of units of another set with respect to each other, indicating means so related to said first named means as to be unactuated during the movements of said means, means for pivoting one of said elements to an element of said first named means and comprising a lever carrying said element upon one arm and having its other arm operatively connected to said indicating means to actuate the same during said lever's movement; substantially as described.

6. In a device of the character indicated, in combination, a plurality of sets of contact elements, means for moving units of one set with respect to each other proportionately to movements of units of another set with respect to each other, indicating means so related to said first named means as to be unactuated during the movements thereof, such indicating means being provided with an actuator, means for pivoting one of said contact elements to a component of said first named means and comprising a lever fulcrumed to such component and supporting upon one of its arms such contact element, the other arm of said lever being operatively connected to said actuator, means acting to urge said lever toward said actuator, and a stop in connection with said lever to limit its movement under the influence of said last named means; substantially as described.

7. In a device of the character indicated, in combination, a pair of arms movably mounted with respect to each other, a plurality of contact elements carried by each said arm, one of said arms being provided with a projection, a lever fulcrumed upon such arm and carrying upon one of its arms one of said contact elements, and indicating means carried by said projection, the other arm of said lever being in operative connection with said indicating means; substantially as described.

8. In a device of the character indicated, in combination, a pair of arms movably mounted with respect to each other, a plurality of contact elements carried by each arm, a lever fulcrumed upon one of said arms and supporting upon one of its arms one of said contact elements, one of said first named arms being provided with a projection, an indicator carried by said projection and provided with an actuator, the other arm of said lever being operatively connected with said actuator, resilient means connecting said projection and said lever and acting to urge said lever toward said actuator, and a stop carried by said projection and in connection with said lever to limit its movement under the influence of said resilient means; substantially as described.

9. In a gage, in combination, a support for gaging arms in the character of a stem with a bifurcated portion, a pair of gaging arms to be mounted for pivotal movement with respect to each other and to said support and between the arms provided by said portion, the one gaging arm having a part in the character of a box received between the arms of said portion and having an aperture, and the other gaging arm being passed through said aperture, and means for pivotally connecting the sides of said aperture with the arms of said bifurcated portion and for pivotally connecting said sides with the other gaging arm; substantially as described.

In testimony whereof, I hereunto affix my signature, in the presence of two witnesses.

ALBERT F. ROCKWELL.

Witnesses:
GEORGE L. SANFORD,
VERNER A. GREENE.